(12) United States Patent
Mei et al.

(10) Patent No.: US 7,495,424 B1
(45) Date of Patent: Feb. 24, 2009

(54) OVERLOAD COMPENSATION CIRCUIT WITH IMPROVED RECOVERY RESPONSE FOR A POWER SUPPLY

(75) Inventors: Tawen Mei, Mountain View, CA (US); Chunping Song, Santa Clara, CA (US)

(73) Assignee: National Semiconductor Corporation, Santa Clara, CA (US)

(*) Notice: Subject to any disclaimer, the term of this patent is extended or adjusted under 35 U.S.C. 154(b) by 249 days.

(21) Appl. No.: 11/464,178

(22) Filed: Aug. 11, 2006

(51) Int. Cl.
*G05F 1/56* (2006.01)
(52) U.S. Cl. .................................................. 323/284
(58) Field of Classification Search ................ 323/282, 323/284, 285
See application file for complete search history.

(56) References Cited

U.S. PATENT DOCUMENTS

| | | | |
|---|---|---|---|
| 6,476,589 B2* | 11/2002 | Umminger et al. | 323/282 |
| 6,804,091 B2 | 10/2004 | Jenkins et al. | |
| 6,940,261 B1* | 9/2005 | Umminger | 323/282 |
| 6,965,502 B2 | 11/2005 | Duffy et al. | |
| 7,012,411 B2* | 3/2006 | Yasukouchi | 323/282 |
| 7,245,113 B2* | 7/2007 | Chen et al. | 323/271 |
| 2004/0135563 A1* | 7/2004 | Mihalka | 323/282 |
| 2005/0242796 A1* | 11/2005 | Yang et al. | 323/282 |
| 2007/0013354 A1* | 1/2007 | Mok et al. | 323/284 |
| 2007/0120548 A1* | 5/2007 | Kojima et al. | 323/284 |
| 2008/0094047 A1* | 4/2008 | Huynh et al. | 323/282 |
| 2008/0111530 A1* | 5/2008 | Hasegawa et al. | 323/284 |

OTHER PUBLICATIONS

Barrado, A. et al., "Stability Analysis of Linear-Nonlinear Control (LnLc) Applied to Fast Transient Response DC-DC Converters," 2003 34th Annual Power Electronics Specialist Conference, Jun. 15-19, 2003, pp. 1175-1180, vol. 3.
Cooke, Philip, "Analysis of a Voltage Controlled Frequency Foldback Technique that Improves Short Circuit Protection for Buck Derived Converters," IEEE, 1996, pp. 749-755.
Lee, Hoi et al., "A Novel Voltage-Control Scheme for Low-Voltage DC-DC Converters with Fast Transient Recovery," The 2000 IEEE International Symposium on Circuits and Systmes, 2000. Proceedings. ISCAS 2000 Geneva. May 28-31, 2000, pp. 256-259, vol. 1.
Roh, Jeongjin, "High-Performance Error Amplifier for Fast Transient DC-DC Converters," IEEE Transactions on Circuits and Systems II: Express Briefs, Sep. 2005, pp. 591-595, vol. 52, Issue 9.

* cited by examiner

*Primary Examiner*—Jeffrey L Sterrett
(74) *Attorney, Agent, or Firm*—Darby & Darby P.C.; Matthew M. Gaffney (57) ABSTRACT

A compensation network for an error amplifier is provided. During normal operation, proportional-integral control is performed, and a capacitor of the compensation network is coupled to the error current. During a fault condition, the capacitor is de-coupled from the error current and discharged, and proportional control is performed. After the fault condition ends, the capacitor is re-connected to the error current.

21 Claims, 5 Drawing Sheets

Fault Condition Operation Mode

OVERLOAD COMPENSATION CIRCUIT WITH IMPROVED RECOVERY RESPONSE FOR A POWER SUPPLY

FIELD OF THE INVENTION

The invention is related to compensation networks, and in particular but not exclusively, to a compensation network that changes from proportional-integral control to proportional control during a fault condition.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor or a bipolar transistor may be employed as an embodiment of a transistor, the scope of the words "gate", "drain", and "source" includes "base", "collector", and "emitter", respectively, and vice versa.

Briefly stated, the invention is related to a compensation network for an error amplifier, which operates as follows in one embodiment. During normal operation, proportional-integral control is performed, and a capacitor of the compensation network is coupled to the error current. During a fault condition, the capacitor is de-coupled from the error current and discharged, and proportional control is performed. After the fault condition ends, the capacitor is re-connected to the error current.

Figure 1:
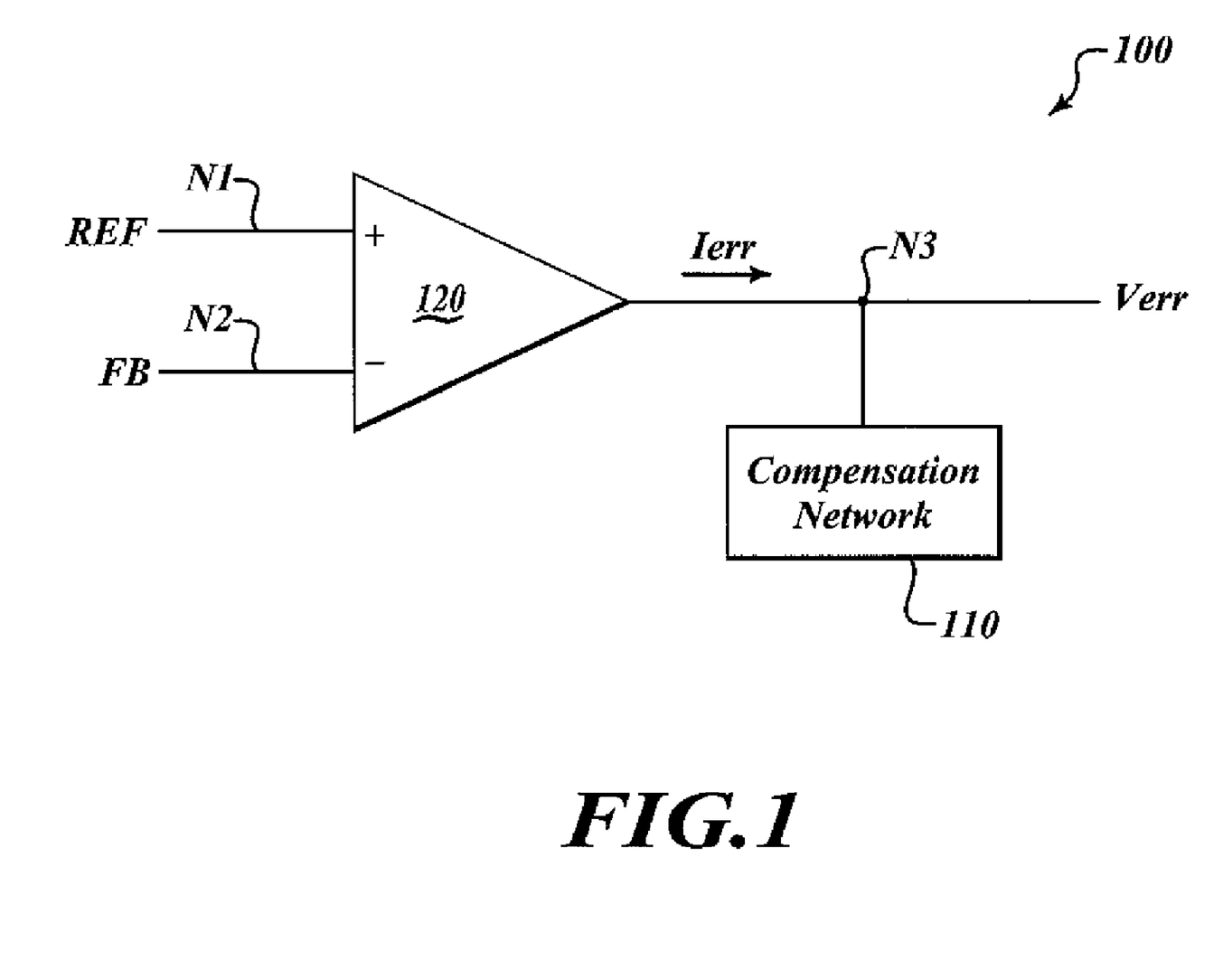
FIG. 1 shows a block diagram of an embodiment of a circuit that includes an error amplifier and a compensation network.

FIG. 1 shows a block diagram of an embodiment of circuit 100, which includes an embodiment of compensation network 110 and error amplifier 120. Error amplifier 120 has a first input coupled to node N1, a second input coupled to node N2, and an output that is coupled to node N3.

In operation, error amplifier 120 is operable to receive reference signal REF and feedback signal FB, and to provide error current Ierr. Further, signal FB is a feedback signal that is based, at least in part, on voltage Verr due to the closed loop operation. Also, compensation network 110 is operable to provide error voltage Verr based, in part, on current Ierr.

During normal operating conditions, compensation network 110 performs at least proportional-integral control. Components other than proportional and integral may also be performed for the control in some embodiments. In one embodiment, compensation network 110 includes a compensation capacitor that is used as the energy storage element for the integral portion of the control. Compensation network 110 is configured for adjustable control so as to ensure that, at the end of a fault condition, a voltage overshoot does not occur. For example, in one embodiment, the compensation capacitor is de-coupled from error current Ierr during a fault condition, and the control is accomplished without the compensation capacitor. For example, in one embodiment, proportional control is performed during the fault condition. In this embodiment, when the fault condition ends, the compensation capacitor is re-connected to error current Ierr. Additionally, the adjustment of the control may be accomplished in other ways in other embodiments.

Figure 2:
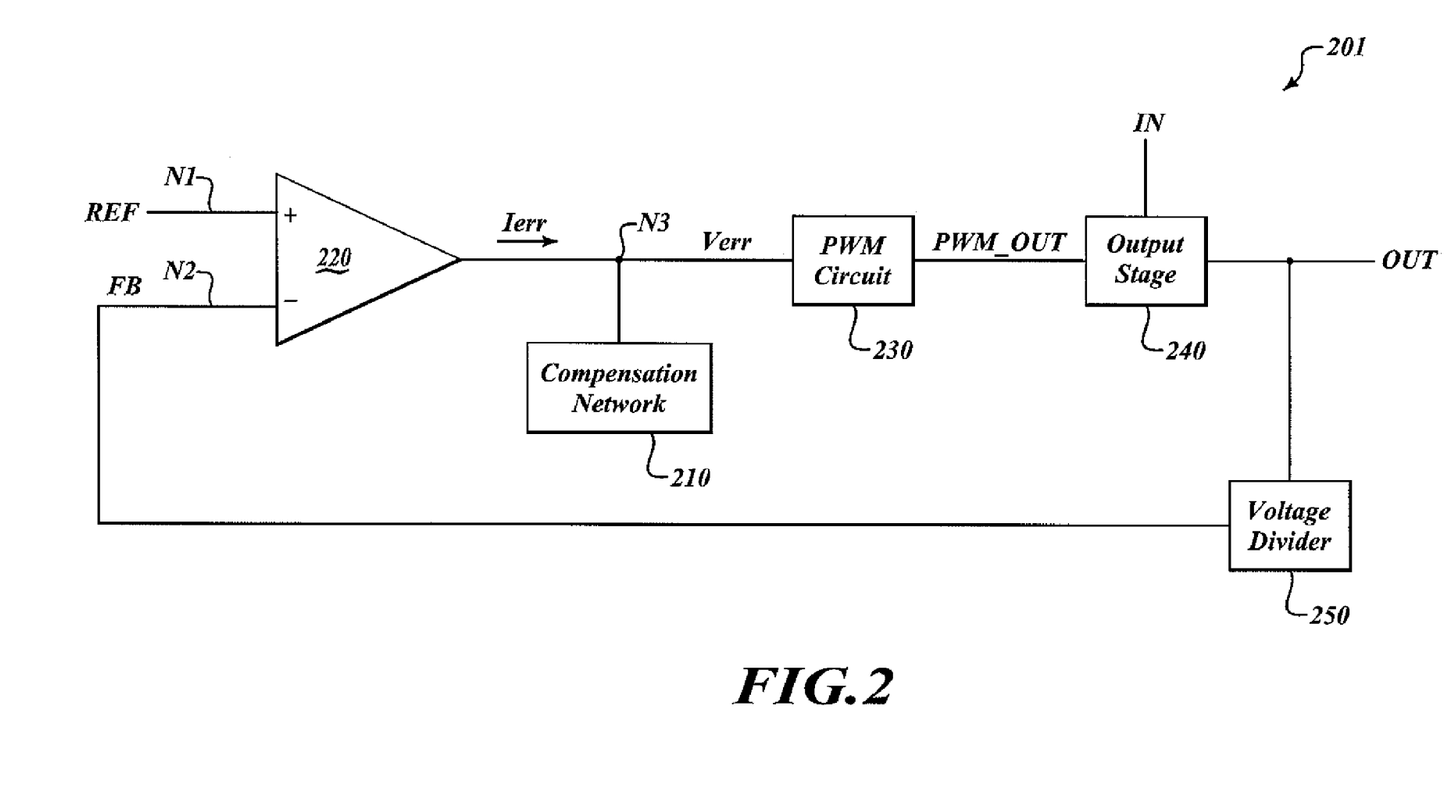
FIG. 2 illustrates a block diagram of an embodiment of a regulator that includes the circuit of FIG. 1.

FIG. 2 shows a block diagram of an embodiment of regulator 201, which includes an embodiment of circuit 100 of FIG. 1. Regulator 201 may further include pulse width modulation (PWM) circuit 230, output stage 240, and voltage divider 250. Although a particular embodiment of regulator 201 is illustrated in FIG. 5, various embodiments may include more or less components.

In one embodiment, PWM circuit 230 is operable to provide PWM output signal PWM_OUT such that the duty cycle of signal PWM is based on error voltage Verr. In other embodiments, PWM circuit 230 may be replaced with a pulse frequency modulation circuit, or the like.

Output stage 240 is operable to provide regulated output signal OUT based on input signal IN and signal PWM_OUT. In one embodiment, output stage 240 includes drivers, switches, and an output LC filter. Also, in one embodiment voltage divider 250 is operable to provide feedback signal FB from signal OUT.

Although a particular embodiment of regulator 201 is discussed above, other embodiments are within the scope and spirit of the invention. For example, in one embodiment, regulator 201 is a switching regulator, as discussed above. In other embodiments, regulator 201 may be a different type of regulator, such as a linear regulator, or the like. Virtually any circuit in which an error amplifier in closed loop operation and a compensation network is employed may be used as an embodiment of circuit 501.

Figure 3A:
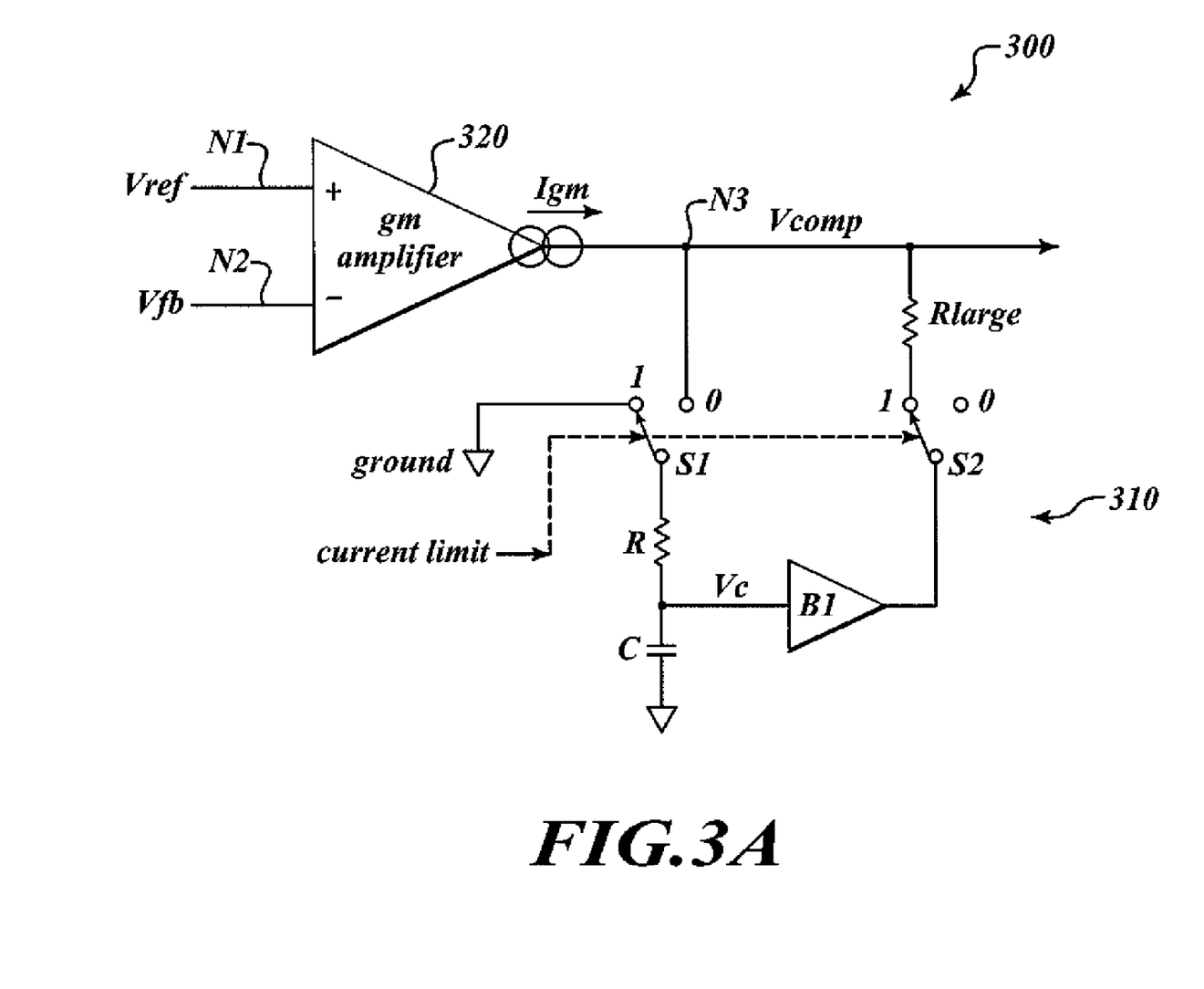
FIG. 3A shows a block diagram of an embodiment of the circuit of FIG. 1.

FIG. 3A shows a block diagram of an embodiment circuit 300, which may be employed as an embodiment of circuit 100 of FIG. 1. Gm amplifier 320 is an embodiment of error amplifier 120 of FIG. 1. Also, current Igm is an embodiment of current error current Ierr of FIG. 1. Vcomp is an embodiment of error voltage Verr of FIG. 1. Further, compensation network 310 includes switches S1 and S2, resistor R, compensation capacitor C, buffer B1, and resistor Rlarge. Resistor Rlarge is a resistive circuit that includes one or more resistive devices. Compensation network 310 may further include additional compensation not shown. During normal operating conditions, circuit 300 operates as described below with regard to FIG. 3B.

Figure 3B:
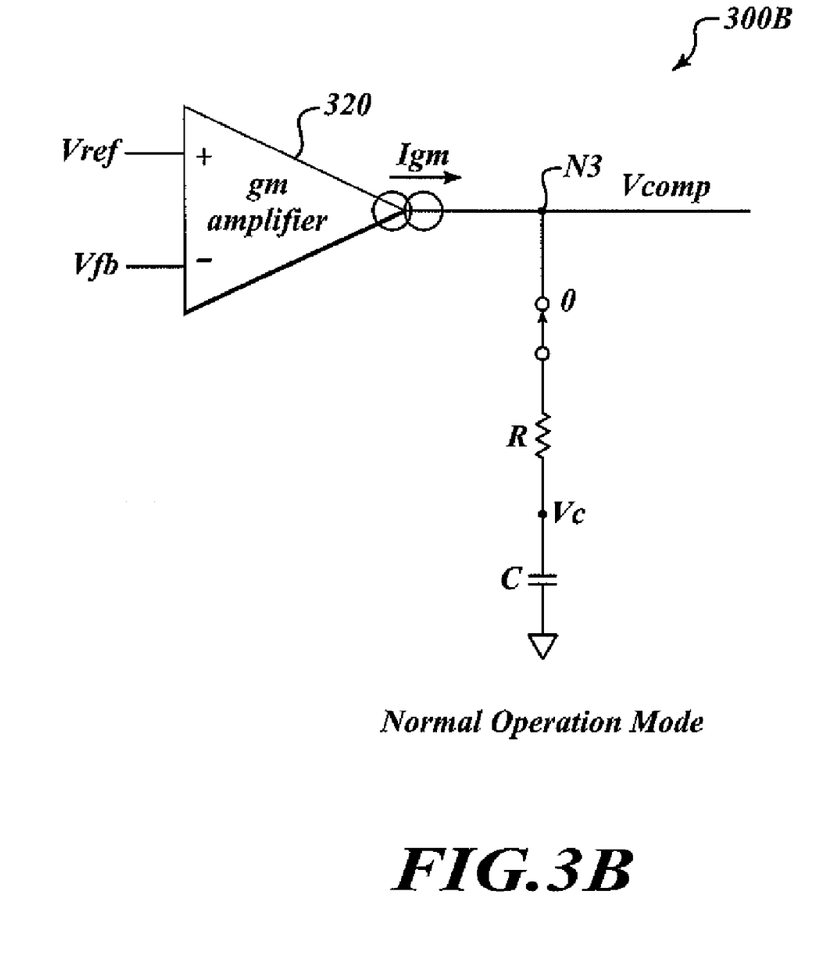
FIG. 3B illustrates a block diagram of an embodiment of the circuit of FIG. 3A in normal operation conditions.

FIG. 3B illustrates a block diagram of an embodiment of circuit 300B, which is an embodiment of circuit 300 of FIG. 3A during normal operation. Compensation 300B operates as a standard RC network performing proportional-integral (PI) control. The RC network is arranged to convert current Igm into voltage Vcomp. Additionally, the RC network achieves design objectives for line and load regulation and dynamic response in the closed loop feedback during normal operation.

Figure 3C:
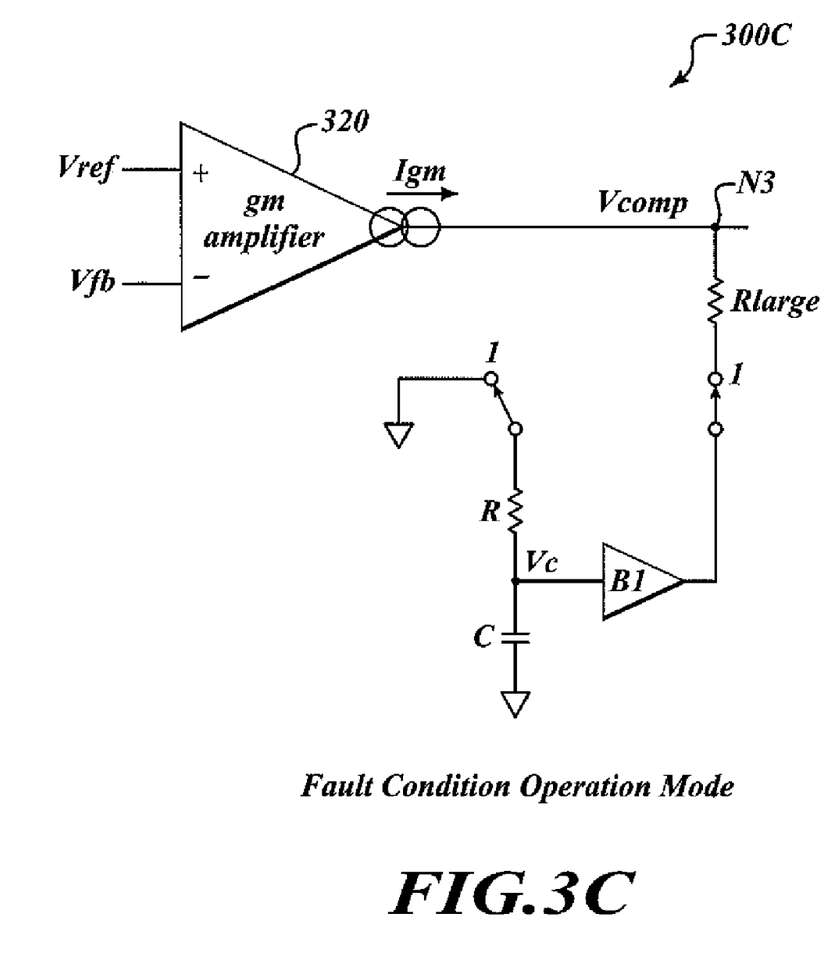
FIG. 3C shows a block diagram of an embodiment of the circuit of FIG. 3A during a fault condition, in accordance with aspects of the present invention.

FIG. 3C illustrates a block diagram of an embodiment of circuit 300C, which is an embodiment of circuit 300 of FIG. 3C during a fault condition, such as an over-current condition. During the fault condition, compensation capacitor C is decoupled from current Igm and discharged. Capacitor Rlarge is connected to the output of gm amplifier 320, so that voltage Vcomp is substantially equal to Igm*Rlarge. In this embodiment, the compensation network 310 provides proportional control the during the fault condition. In one embodiment, resistor Rlarge is a single transistor. In other embodiments, resistor Rlarge includes one or more resistive devices coupled in series and/or in parallel to provide an equivalent resistance of Rlarge. In one embodiment, Rlarge includes at least one transistor biased as a resistive device. In some embodiments, resistance Rlarge is adjustable. In a preferred embodiment, the equivalent resistance Rlarge is selected to be large enough to ensure that Vcomp can cover all duty cycles. However, the invention is not so limited.

When the fault conditions ends, the normal operation mode resumes as illustrated in FIG. 3B. In one embodiment, when normal operation resumes, there is substantially no charge on compensation capacitor C.

If the arrangement illustrated in FIG. 3B were maintained throughout both normal operating conditions and fault conditions, the difference between Vref and Vfb would cause compensation capacitor C to be charged with Igm_max and finally saturate gm amplifier 320. Accordingly, the voltage Vcomp would stay at its highest voltage level and the voltage would be stored in compensation capacitor C. If the fault condition then ended, Vcomp would be at this highest level and remain there for a while, with a relatively long amount of time needed to discharge the relatively large compensation capacitor C. This would cause a relatively large voltage overshoot and a relatively long regulation time.

However, by adjusting the control as illustrated in FIG. 3C during the fault condition, compensation network 310 ensures that a voltage overshoot does not occur when the fault condition ends. Further, output over-current recovery regulation time is relatively short for circuit 300.

Although one embodiment of circuit 300 is illustrated in FIGS. 3A-3C, many alternative embodiments are within the scope and spirit of the invention. For example, instead of coupling resistor Rlarge to the output of buffer B1 as illustrated in FIG. 3C, in another embodiment, resistor Rlarge may be coupled to ground rather than the output of buffer B1 (with the other end connected to the output of gm amplifier 320 as shown). Also, rather than tying the capacitor to ground during fault conditions, in other embodiments, the capacitor may instead be tied to a relatively low voltage, so that the capacitor is partially discharged rather than fully discharged during fault conditions.

Further, although a particular compensation scheme for normal operation is illustrated in FIG. 3B, any compensation scheme involving at least proportional-integral control may be employed. Also, a particular compensation scheme is for fault conditions is illustrated in FIG. 3C, any compensation scheme that does not involve compensation capacitor C in the compensation may be employed during the fault condition. These embodiments and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A regulator controller, comprising:
   an error amplifier having at least an output, wherein the error amplifier is operable to provide an error current at the output of the error amplifier; and
   a compensation network that is coupled to the output of the error amplifier, wherein the compensation network includes:
   a capacitor; and
   a switch that is arranged to de-couple the capacitor from the error current if a fault condition occurs.

2. The regulator controller of claim 1,
   wherein the compensation network is arranged to perform at least proportional-integral control during normal operation conditions.

3. The regulator controller of claim 1, wherein
   the capacitor and the switch are arranged such that, during a fault condition, the capacitor is discharged.

4. The regulator controller of claim 1, wherein
   the compensation network further includes:
   a resistive circuit that includes at least one resistive device; and
   a second switch that is arranged to couple the resistive circuit to the output of the error amplifier if a fault condition occurs, such that proportional control is performed during the fault condition.

5. The regulator controller of claim 4, wherein
   the resistive circuit is coupled between the output of the error amplifier and a switch node;

the second switch is coupled between the switch node and another node.

6. The regulator controller of claim 5, wherein the compensation circuit is arranged such that said another node has a voltage that is substantially equal to a voltage at a ground node if a fault condition occurs.

7. The regulator controller of claim 1, wherein:
the compensation network further includes a resistor;
the switch is coupled between the output of the error amplifier and a resistor node;
the resistor is coupled between the resistor node and a capacitor node; and
wherein the capacitor is coupled to the capacitor node.

8. The regulator controller of claim 7, wherein
the compensation network further includes:
   a resistive circuit that includes at least one resistive device; and
   a second switch that is arranged to couple the resistive circuit to the output of the error amplifier if a fault condition occurs, such that proportional control is performed during the fault condition.

9. The regulator controller of claim 8, wherein
the resistive circuit is coupled between the output of the error amplifier and a switch node; and
wherein the second switch is coupled between the switch node and another node.

10. The regulator controller of claim 1, further comprising:
a control circuit that is operable to control regulation of an output voltage based, in part, on an error voltage, wherein the error amplifier is arranged to receive a reference signal and a feedback signal, and to provide the error current such that the error current is substantially proportional to a difference between the reference signal and the feedback signal; the feedback signal is based, in part, on the output voltage; and wherein the compensation circuit is arranged to convert the error current into the error voltage.

11. The regulator controller of claim 10, wherein the control circuit includes a pulse width modulation circuit that is arranged to provide a pulse width modulation output signal such that a duty cycle of the pulse width modulation output signal is based on the error voltage, wherein the output voltage is based, in part, on the pulse width modulation output signal.

12. A regulator controller, comprising:
an error amplifier having at least at output; and
a compensation network that is operable to enable closed-loop compensation to be performed for the error amplifier based on a control, wherein the compensation network is configured to enable at least proportional-integral control during normal operating conditions, and further operable to adjust the control so as to ensure that, at the end of a fault condition, a voltage overshoot does not occur.

13. The regulator controller of claim 12, wherein the compensation network includes:
   a resistive circuit; and
   a switch that is operable to couple the resistive circuit to the output of the error amplifier if a fault condition occurs, such that proportional control is performed if a fault condition occurs.

14. The regulator controller of claim 12, wherein the compensation network includes:
   a capacitor that is arranged to operate as an energy storage element for the integral portion of the proportional-integral control during normal operation conditions; and
   a switch that is operable to de-couple the capacitor from an error current if a fault condition occurs, wherein the error amplifier is operable to provide the error current at the output of the error amplifier.

15. The regulator controller of claim 14, wherein the compensation network further includes:
   a resistive circuit; and
   a second switch that is operable to couple the resistive circuit to the output of the error amplifier if a fault condition occurs, such that proportional control is performed if a fault condition occurs.

16. A method for voltage regulation, comprising:
providing an error current based, in part, on a reference signal and a feedback signal;
performing closed-loop compensation based on a control to provide an error voltage based on the error current, wherein the control is at least proportional-integral control during normal operating conditions; and
adjusting the control so as to ensure that, at the end of a fault condition, a voltage overshoot does not occur.

17. The method of claim 16, wherein
the proportional-integral is accomplished, in part, with a compensation capacitor.

18. The method of claim 16, wherein
adjusting the control includes:
   if a fault condition occurs, adjusting the control to proportional control;
   if the fault condition ends, adjusting the control to at least proportional-integral control.

19. The method of claim 18, wherein
the proportional-integral is accomplished, in part, with a compensation capacitor; and
adjusting the control to proportional control if the fault condition ends includes de-coupling the compensation capacitor from the error current.

20. The method of claim 19, wherein
performing the at least proportional-integral control includes:
coupling an RC network to the error current, wherein the RC network includes the compensation capacitor.

21. The method of claim 16, wherein
the fault condition is an overload condition, such that the switch that is operable to de-couple the capacitor from an error current if an overload condition occurs.

* * * * *

UNITED STATES PATENT AND TRADEMARK OFFICE
CERTIFICATE OF CORRECTION

| | |
|---|---|
| PATENT NO. | : 7,495,424 B1 |
| APPLICATION NO. | : 11/464178 |
| DATED | : February 24, 2009 |
| INVENTOR(S) | : Tawen Mei et al. |

It is certified that error appears in the above-identified patent and that said Letters Patent is hereby corrected as shown below:

On the title page, item (56), under "Other Publications", column 2, line 10, delete "Systmes," and insert -- Systems, --, therefor.

In the Claims, Col. 5, Claim 12, Line 2, delete "at," and insert -- an --, therefor. (Second occurrence)

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,495,424 B1  
APPLICATION NO. : 11/464178  
DATED : February 24, 2009  
INVENTOR(S) : Tawen Mei et al.

Page 1 of 1

It is certified that error appears in the above-identified patent and that said Letters Patent is hereby corrected as shown below:

On the title page, item (56), under "Other Publications", column 2, line 10, delete "Systmes," and insert -- Systems, --, therefor.

In the Claims, Col. 5, Claim 12, Line 46, delete "at," and insert -- an --, therefor. (Second occurrence)

This certificate supersedes the Certificate of Correction issued October 27, 2009.

Signed and Sealed this

Seventeenth Day of November, 2009

David J. Kappos  
*Director of the United States Patent and Trademark Office*